UNITED STATES PATENT OFFICE.

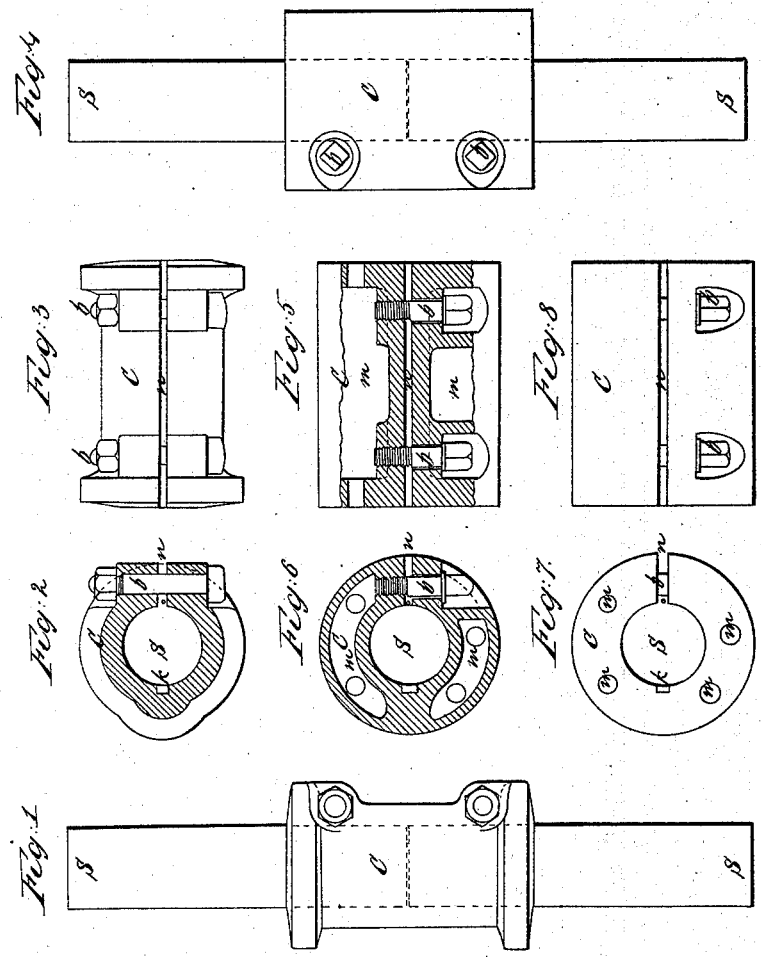

ROBERT BRIGGS, OF PHILADELPHIA, PENNSYLVANIA.

IMPROVEMENT IN COUPLINGS FOR SHAFTING.

Specification forming part of Letters Patent No. 47,388, dated April 25, 1865.

*To all whom it may concern:*

Be it known that I, ROBERT BRIGGS, of Philadelphia, in the county of Philadelphia and State of Pennsylvania, have invented a new and Improved Coupling for Shafts; and I do hereby declare that the following is a full and exact description thereof, reference being had to the accompanying drawings, and to the letters of reference marked thereon.

My invention consists in the use of a single cylindrical casting or forging, C, with a slot or opening, $n$, along one side of the cylinder, which slot $n$ can be closed or clamped together by bolts $b$, so that the requisite closeness of fit for insuring the line of the pieces of shaft S, which are coupled, is attained by tightening the bolts $b$, and great facility for uncoupling or loosening the bolts $b$ and permitting the slot $n$ to open, either by the elasticity of the cylinder or by a key or wedge inserted in the slot $n$.

I describe two methods of constructing the coupling C, which are substantially the same, but exhibit dissimilar external forms.

Figure 1 shows a plan of the coupling C, with two ends of shafting S inserted; Fig. 2, a cross-section through the coupling C at the bolt $b$, and Fig. 3 a side view of the coupling C. This form has the least possible material which the torsional strains will allow, but presents externally certain irregularities of form, and exposes the heads and nuts of the bolts $b$, so as to produce, when in motion, an unpleasant appearance, as well as having a greater liability to catch belting which might fall upon it than a smooth cylindrical surface would offer. Fig. 4 shows a plan of a second form of coupling C, with two ends of shaft S; Fig. 5 a longitudinal section, Fig. 6 a cross-section, Fig. 7 an end view, and Fig. 8 a side view, of the same form. This form is that given by the smallest external cylinder which will include the ends of the countersunk bolt $b$ heads, and is shown on the drawings cored out at $m$, so as to give the least amount of material consistent at once with the requirement for strength and the capability to be cast.

In the process of manufacture, I prefer to cast the coupling C with a thin web of metal along the slot $n$ on the inside, at $o$, and after boring out the hole to the exact diameter of the shaft S in solid (or rather a continuous surface of) metal, and planing out the key-way $k$, to cut or break out the web of metal remaining between the cast slot $n$ and the hole for the shaft S.

It will thus be found that the coupling C can be sprung open to slide readily on the shaft S, and when clamped by the bolts $b$ will hold them tightly.

It will be found, also, that not only will a coupling thus made answer when the two ends of shafts coupled are larger or smaller than they should be, or the coupling itself may be smaller or larger, (these variations of sizes being only within the limits of usual workshop fitting—say one to three thousandths of the proper diameters,) but will also answer for small variations of the sizes of the ends of the shafts in juxtaposition, or of the two ends of the same coupling.

The second form of coupling C, Figs. 4 to 8, can be turned and finished externally, to be used as a small pulley, if desired.

I am aware that clamped couplings for shafts in other forms have been before proposed and used; that a split conical frustum enveloped by another drawn upon it by screws has been proposed; that two split conical frusta inclosing the ends of the two shafts to be coupled, and drawn by screws into a reverse double frusta, has been in use.

I am aware that the plan of grasping tightly a cylindrical body by a split envelope clamped by screws—as in micrometer or tangent screws on instruments for astronomical or other purposes, clamps for rotating vises, clamps for spindles in the tail-stocks of lathes, &c.—has been generally known and used for many years; but

I claim as my invention and desire to secure by Letters Patent—

The construction of couplings for shafts of a cylindrical casting or forging, C, with a slot or opening, $n$, along one side, and clamped together by bolts $b$, as described.

ROBT. BRIGGS.

Witnesses:
STEPHEN P. M. TASKER,
HENRY G. MORRIS.